United States Patent Office 3,453,591
Patented July 1, 1969

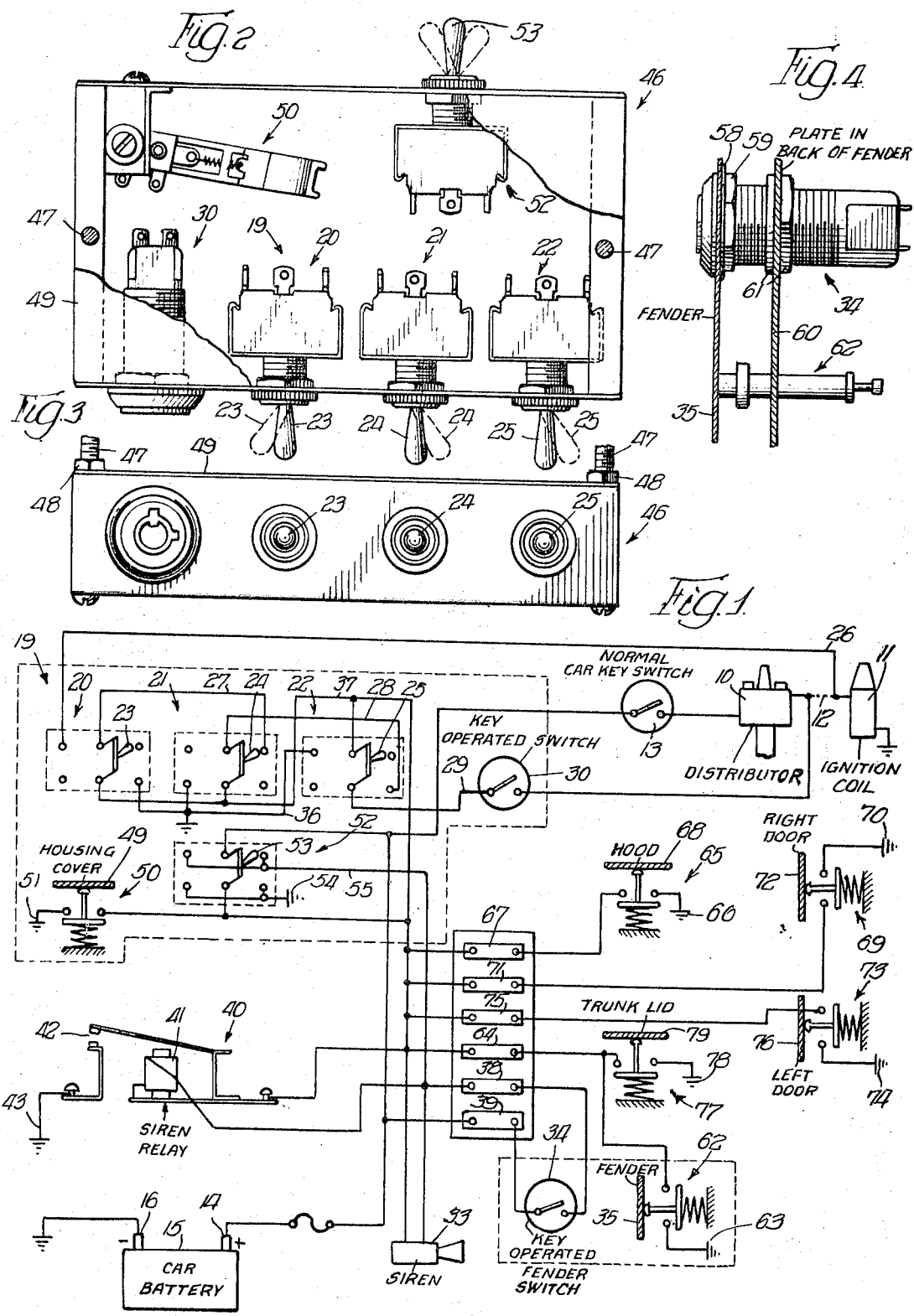
July 1, 1969     C. PEREZ     3,453,591
TAMPERPROOF SYSTEM FOR VEHICLES, SUCH AS AUTOMOBILES
Filed Feb. 28, 1966

3,453,591
TAMPERPROOF SYSTEM FOR VEHICLES, SUCH AS AUTOMOBILES
Carlos Perez, 2623 Evergreen St., Chicago, Ill. 60622
Filed Feb. 28, 1966, Ser. No. 530,468
Int. Cl. B60r 25/04; G08b 13/08
U.S. Cl. 340—64                                   7 Claims

ABSTRACT OF THE DISCLOSURE

Unauthorized use of an automobile is prevented by connecting a plurality of three position switches in series with the ignition circuit and requiring that each switch be in only one position to complete the ignition circuit. A tamper signal is energized if any of the three position switches is operated by an unauthorized person or an attempt is made to open the hood, doors, or trunk.

Among the objects of this invention are: To provide for preventing unauthorized operation of a vehicle, such as an automobile, and/or signaling that it is being tampered with; to connect in series with the ignition circuit of the vehicle a plurality of series connected multiposition switches, each of which is required to occupy a predetermined position to permit completion of the ignition circuit; to provide a key operated switch in series with the series connected multiposition switches; to mount these switches in a housing having a cover that holds a tamper switch open until the cover is removed whereupon a tamper signal is energized; to energize the tamper signal if any of the multiposition switches is operated to other than the position required to complete the ignition circuit; to condition the tamper signal for energization by operation of a second key operated switch; to provide additional tamper switches that are arranged to be closed on unauthorized operation of the door, hood, trunk lid, etc., for energizing the tamper signal when the second key operated switch is closed; and to maintain the tamper signal in operation after any of the tamper switches have been restored to normal open circuit position as long as the second key operated switch remains in the closed position.

In the drawing: FIG. 1 illustrates, diagrammatically, a system embodying this invention. FIG. 2 is a top plan view of the housing in which the multiposition switch assembly is mounted, the cover being shown broken away to illustrate the switches mounted in the housing. FIG. 3 is a view, in front elevation, of the housing and the switch assembly shown in FIG. 2. FIG. 4 is a view, partly in plan and partly in section, showing how a tamper switch is mounted in conjunction with a key operated switch that is positioned for example, in the fender of an automobile.

Referring now to FIG. 1, the reference character 10 indicates a conventional distributor that is arranged to cooperate with a conventional ignition coil 11 which is arranged to be grounded. Normally the distributor 10 and ignition coil 11 are interconnected by a conductor 12, which is shown, in part, by a broken line, since this circuit is opened as will be described presently. A normal car key switch 13 is connected in the energizing circuit to the distributor 10 from positive terminal 14 of a source of energy, such as a car battery 15, the negative terminal 16 of which is grounded. It will be understood that this system is conventional and that the present invention can be employed with other conventional automotive ignition systems.

In accordance with this invention the conductor 12 is opened, as indicated by the broken line portion thereof, and a multiposition switch assembly, indicated generally at 19, is connected in series circuit relation between the distributor 10 and the ignition coil 11. The multiposition switch assembly 19 includes a plurality, for example three, switches indicated generally at 20, 21 and 22. These switches 20, 21 and 22 are double pole double throw switches. If it is desired that only a control for the circuit between the distributor 10 and coil 11 be employed, then single pole double throw switches can be used. However, as will appear hereinafter, it is desirable to employ the double pole double throw switch arrangement in order to provide a signal in the event that any of the switches 20, 21 or 22 is improperly operated.

The switches 20, 21 and 22 are provided with operating handles 23, 24 and 25, respectively, which have an intermediate "off" position and "on" position on either side of the "off" position.

The switches 20, 21 and 22 are interconnected in series in such manner that the ignition circuit can be completed only if the switches 20, 21 and 22 occupy certain predetermined "on" positions.

When the operating handle 23 is in the left position and the operating handles 24 and 25 are in the right position a circuit is completed from the ignition coil 11 to conductor 26, contacts of switch 20, conductor 27, contacts of switch 21, conductor 28 and contacts of switch 22 to a conductor 29 which is connected through a key operated switch 30 to the distributor 10. Not only must the switches 20, 21 and 22 be operated to the positions indicated but also the key operated switch 30 must be closed to complete the ignition circuit so that, on operation of the car key switch 13, the engine can be started. Preferably the key operated switch 30 is of known construction in which a special key is required that is different from almost any other key that is likely to be available.

It will be understood that the circuit connections shown for the switches 20, 21 and 22 and just described can be varied, either by changing the electrical connections or merely by rotating one or more of the individual switches 20, 21 and 22 through 180°. The important aim is that it is not readily apparent to an unauthorized person the positions in which the switches 20, 21 and 22 must be in order to permit completion of the ignition circuit and starting of the engine. FIG. 2 shows the positions of the operating handles 23, 24 and 25 by broken lines which correspond to the positions of the respective switches 20, 21 and 22 for completing the energizing circuit for the ignition circuit of the vehicle when the key operated switch 30 is closed.

For illustrative purposes the following table indicates various combinations of positions of the handles 23, 24 and 25 that can be employed.

| Handle 23 | Handle 24 | Handle 25 |
|---|---|---|
| Left | Right | Right |
| Left | Left | Right |
| Left | Left | Left |
| Right | Right | Right |
| Right | Right | Left |
| Right | Left | Left |
| Right | Left | Right |
| Left | Right | Left |

It is desirable that provision be made for signaling if an unauthorized person undertakes to tamper with the vehicle. In so doing such a person would undertake to operate the switches 20, 21 and 22 from the normal open positions to one of the "on" positions. In the event that this occurs, a tamper signal in the form of a siren 33 is energized and continues to sound the alarm until the energizing circuit therefor is opened. It will be understood that the siren 33 is intended to be mounted on the vehicle at a relatively inaccessible position.

Since it is undesirable to condition the siren 33 for operation under normal operating conditions, a key operated fender switch 34 is employed which, as the name indicates, can be mounted on the fender 35, FIG. 4, of the vehicle. This position is arbitrarily chosen and the switch 34, which can be duplicate of the switch 30, can be mounted at some other location on the vehicle where it can be conveniently operated when the owner leaves it. When this occurs, the authorized person, after restoring the operating handles 23, 24 and 25 to their "off" positions, inserts a key in the fender switch 34 and operates it to the closed position. This prepares a circuit for energizing the siren 33 in a manner now to be described.

Associated with the switches 20, 21 and 22 is a grounded conductor 36 and a common conductor 37 which connects to one terminal of the siren 33. Assuming that the switch 22, instead of being thrown to the right is thrown to the left, then a circuit is completed from grounded conductor 36 through conductor 37, siren 33, terminal strip 38, contacts of key operated fender switch 34, terminal strip 39 to the positive terminal 14 of the car battery 15 the negative terminal 16 of which is grounded. The siren 33 then sounds the alarm.

Now it is desirable that, once the siren 33 has been energized, it be maintained energized until the key operated fender switch 34 is opened. For this purpose a relay, shown generally at 40, is employed. It includes an operating winding 41 that is connected for energization between the conductor 37 and the terminal strip 38. As soon as conductor 37 is connected to ground in the manner described, the operating winding 41 is likewise connected to ground and is energized to close contacts 42 to maintain the circuit to ground at 43 even though the ground is removed from conductor 37 by opening switch 22. In order to shut off the siren 33 it is necessary to insert the key in the switch 34 and open it.

As shown in FIGS. 2 and 3 the switch assembly 19 is mounted in a metallic housing as indicated, generally, at 46. The metallic housing 46 can be secured to the vehicle, preferably adjacent the steering column, by bolts 47. Nuts 48 on the bolts 47 serve to hold a removable cover plate 49 in position to enclose the switches 20, 21 and 22 as well as the key operated switch 30, all of which are mounted on a front wall.

There is the possibility that an unauthorized person might undertake to open the metallic housing 46 by removing the cover plate 49. The purpose of this would be to obtain access to the connections to the various switches and place them out of operation. Accordingly, a tamper switch, shown generally at 50, is mounted in the metallic housing 46 and is arranged, as shown in FIG. 1, to be held in the normally open position as long as the cover 49 remains in the closed position. As soon as the cover 49 is removed, the tamper switch 50 closes it contacts and completes a circuit to ground indicated at 51. This grounds conductor 37 and the siren 33 is energized in the manner previously described.

There may be some instances where it is desirable that the occupant of the vehicle energize the siren 33. This might occur if it should appear that an intruder is likely to enter the vehicle without authorization. For this purpose an emergency signal switch 52 is mounted on the rear wall of the metallic housing 46 in a location where it is not readily visible. It is provided with an operating handle 53 which as shown in FIG. 1, can be operated to either side for completing a circuit from ground 54 to the siren 33 as well as completing at conductor 55 a circuit directly to the positive terminal 14 of the car battery 15. The siren 33 continues to operate as long as the operating handle 53 of the emergency signal switch 52 remains in either "on" position.

There is the possibility that an unauthorized person may attempt to tamper with the key operated fender switch 34. For example, steps may be taken to cut the portion of the fender 35 on which it is mounted, FIG. 4, by a washer 58 and a clamp nut 59. The purpose of this would be to obtain access to the terminals of the key operated fender switch 34 for the purpose of opening the circuit therethrough.

In order to operate the siren 33 in the event that such action should be taken with respect to the key operated fender switch 34, it is arranged to carry a mounting plate 60 which is secured thereto by clamp nuts 61. The mounting plate 60 carries a tamper switch, indicated generally at 62, which, as shown in FIG. 1, is arranged to be held in the open position as long as the mounting plate 60 remains at a fixed distance from the inside of the fender 35. Should the key operated fender switch 34 be removed, as by cutting it from the fender 35, then the tamper switch 62 is operated to complete a circuit to ground 63 and from it through terminal strip 64 to the siren 33. It sounds the alarm and continues to do so since the relay 40 is energized in the manner previously described.

In order to protect from tampering various other parts of the vehicle additional tamper switches can be provided. For example, a hood tamper switch, shown generally at 65, is arranged to complete a circuit to ground 66 and through a terminal strip 67 to the conductor 37. The contacts of the hood tamper switch 65 are held open as long as the hood, a portion of which is shown at 68, remains in the normal closed position. As soon as the hood 68 is opened, the contacts of the hood tamper switch 65 are closed and the circuit is completed for energizing the siren 33 and for maintaining it energized, assuming of course that key operated fender switch 34 has been moved to the closed position.

For protecting the right door a right door tamper switch, shown generally at 69, is provided. It is arranged to complete a circuit from ground 70 through terminal strip 71 to the conductor 37. The right door tamper switch 69 is held in the open position as long as the right door 72 remains closed. When it is opened, the contacts of the right door tamper switch 69 are closed to complete the energizing circuit for the siren 33.

In like manner the left door of the vehicle can be protected by a left door tamper switch that is shown, generally, at 73. It is arranged to complete a circuit from ground 74 through a terminal strip 75 to the conductor 37. On opening of the left door, indicated at 76, the contacts of the left door tamper switch 73 are closed and the circuit is completed for energizing the siren 33 and for maintaining it energized.

For protecting the trunk, a trunk tamper switch, shown generally at 77, is provided. It is arranged to complete a circuit from ground 78 through the terminal strip 64 to the conductor 37. On opening of the trunk lid, a portion of which is indicated at 79, the trunk tamper switch 77 is operated to close its contacts and complete an energizing circuit for the siren 33 which is maintained by the relay 40 in the manner described.

It will be understood that additional tamper switches can be provided in conjunction with other parts of the vehicle that are likely to be the subject of attack by an unauthorized person.

What is claimed as new is:

1. A system for signalling that a device has been tampered with comprising:

a source of electric current, electrically energizable tamper signal means, tamper switch means on said device having normally open contacts adapted to be closed when said device is tampered with, key operated switch means having contacts adapted to be closed by a key, circuit means connecting said tamper signal means for energization to said current source through said contacts of said tamper switch means and said key operated switch means in series, and a relay having:

normally open contacts connected in parallel with said contacts of said tamper switch means, and an operating winding connected in parallel with said tamper signal means, closure of said contacts of said tamper switch means when said contacts of said key operated switch means are closed completing an energizing circuit from said current source to said tamper signal means and to said operating winding whereby said tamper signal means is energized, said relay contacts are closed and said tamper signal means and said operating winding remain energized when said contacts of said tamper switch are opened until said contacts of said key operated switch are opened.

2. The signalling system called for in claim 1 wherein a plurality of tamper switches at various locations on said device likely to be tampered with have normally open contacts connected in parallel with said contacts of said tamper switch.

3. A system for preventing unauthorized use of a vehicle, such as an automobile, having means energized from a source of electrical energy for controlling the operation thereof, said system comprising:

a plurality of switches connected in series circuit relation for connection between said means and said source, each of said switches having at least three positions to which each switch can be operated and arranged that said series circuit is completed only when each switch occupies one of its positions, and each of said switches having a central "off" and "on" position each side of said "off" position with only one of the "on" positions being connected in the series circuit.

4. A system for preventing unauthorized use of a vehicle, such as an automobile, having means energized from a source of electrical energy for controlling the operation thereof, said system comprising:

a plurality of switches connected in series circuit relation for connection between said means and said source, each of said switches having at least three positions to which each switch can be operated and arranged that said series circuit is completed only when each switch occupies one of its positions, a key operated switch interposed in the series circuit and adapted to complete said series circuit on insertion of a key individual thereto, a tamper signal adapted to be mounted on the vehicle, tamper switch means for connecting said tamper signal for energization to an energy source, a second key operated switch interposed in series with said tamper switch means and said tamper signal and adapted to complete the circuit therethrough on insertion of a key individual thereto, and a relay adapted to be energized on operation of said tamper switch means with said second key operated switch closed to maintain the circuit to said tamper signal after it is opened by restoration of said tamper switch means to normal position.

5. A system for preventing unauthorized use of a vehicle, such as an automobile, having means energized from a source of electrical energy for controlling the operation thereof, said system comprising:

a plurality of switches connected in series circuit relation for connection between said means and said source, each of said switches having at least three positions to which each switch can be operated and arranged that said series circuit is completed only when each switch occupies one of its positions, a key operated switch interposed in the series circuit and adapted to complete said series circuit on insertion of a key individual thereto, a housing adapted to be mounted on the vehicle and enclosing said switches, a removable cover carried by said housing, a tamper switch mounted in said housing and adapted to be maintained in open position by said cover as long as it remains in the normally closed position, a tamper signal adapted to be mounted on the vehicle, and circuit means interconnecting said tamper switch and said tamper signal and arranged to be completed when said cover is removed from said normally closed position.

6. A system for preventing unauthorized use of a vehicle, such as an automobile, having means energized from a source of electrical energy for controlling the operation thereof, said system comprising:

a plurality of switches connected in series circuit relation for connection between said means and said source, each of said switches having at least three positions to which each switch can be operated and arranged that said series circuit is completed only when each switch occupies one of its positions, a key operated switch interposed in the series circuit and adapted to complete said series circuit on insertion of a key individual thereto, a tamper signal adapted to be mounted on the vehicle, tamper switch means for connecting said tamper signal for energization to an energy source, a second key operated switch interposed in series with said tamper switch means and said tamper signal and adapted to complete the circuit therethrough on insertion of a key individual thereto, the second key operated switch being arranged to be mounted on the vehicle in a position where an unauthorized person may attempt to remove it bodily, and said tamper switch means includes a tamper switch mounted on said second key operated switch and adapted to complete the circuit to said tamper signal on bodily movement of said second key operated switch.

7. A system for preventing unauthorized use of a vehicle, such as an automobile, having means energized from a source of electrical energy for controlling the operation thereof, said system comprising:

a plurality of switches connected in series circuit relation for connection between said means and said source, each of said switches having at least three positions to which each switch can be operated and arranged that said series circuit is completed only when each switch occupies one of its positions, a tamper signal adapted to be mounted on the vehicle, circuit means including said switches connecting said tamper signal for energization to an energy source in the event that any of said switches is operated to a position other than the one position thereof required to complete the series circuit, a key operated switch interposed in series with said tamper signal and adapted to complete the circuit therethrough on insertion of a key individual thereto, and a relay adapted to be energized on energization of said tamper signal to maintain the circuit thereto as long as said key operated switch remains in closed position.

References Cited
UNITED STATES PATENTS

| | | | |
|---|---|---|---|
| 2,251,735 | 8/1941 | Goleby | 340—64 |
| 2,583,752 | 1/1952 | Smith | 340—64 |
| 3,214,531 | 10/1965 | Dux | 200—43 |

ALVIN H. WARING, Primary Examiner.

U.S. Cl. X.R.

180—82; 200—42; 307—10; 340—276